A. J. RITTER.
Thill-Coupling.
No. 26,926. Patented Jan. 24, 1860.
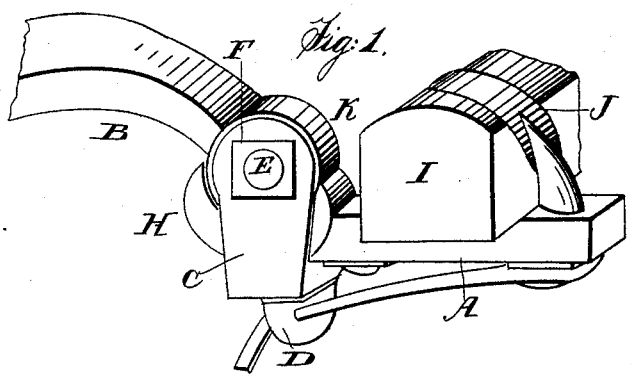
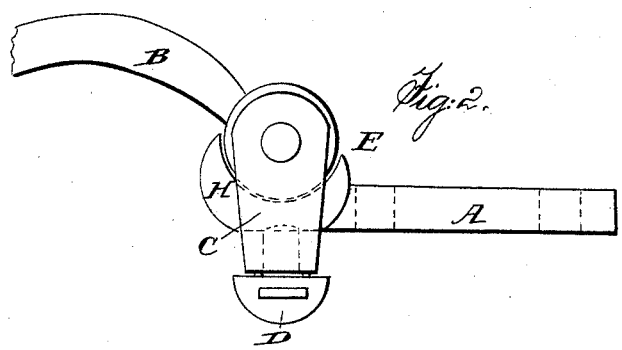
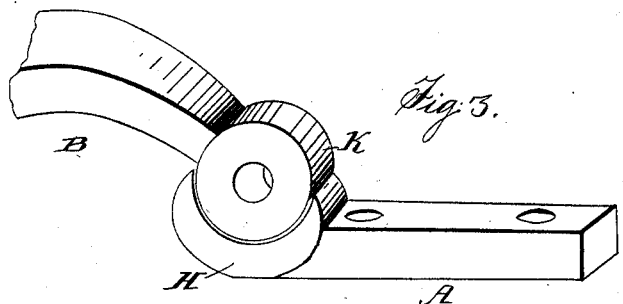
Witnesses:
Gilbert C. Ritter
Joseph Neff
Inventor:
Andrew J. Ritter

UNITED STATES PATENT OFFICE.

ANDREW J. RITTER, OF RAHWAY, NEW JERSEY.

ATTACHING THILLS TO VEHICLES.

Specification of Letters Patent No. 26,926, dated January 24, 1860.

*To all whom it may concern:*

Be it known that I, ANDREW J. RITTER, of Rahway, county of Union, State of New Jersey, have invented a new and Improved Mode of Attaching and Detaching Shafts or Poles to Vehicles; and I do hereby declare that the following is a full and exact description thereof, reference being had to the accompanying drawings and to the letters of reference marked thereon.

The nature of my invention consists in providing a new and more convenient method of attaching and detaching shafts or poles to vehicles, and at the same time to prevent the usual rattling which is common to the old device.

To enable others skilled in the art of attaching shafts or poles to vehicles, to make and use my improved coupling, I will describe it in the following specification and the drawings annexed thereto, which form a part of the same, reference being had to the letters marked thereon.

The same letters refer to the same parts in all of the drawings.

A, Figures 1 and 2, is the piece of iron which is fastened to the axel I by means of common clip J.

B, Figs. 1 and 2, is the piece of iron usually made with a cylindrical head, (generally called the shaft eye) on the back end of the shafts or pole as the case may be, the head being usually secured by means of a pair of jaws or lugs forged on the end of B, the two being secured together by means of a screw bolt passing through them and fastening with a nut.

Now the object of my invention is to provide a more convenient method of attaching and detaching these parts and at the same time to prevent the disagreeable rattling incident to the old device. Instead therefore of attaching and detaching the parts A and B in the manner above described, I do it as follows, viz. Instead of forging a pair of lugs on the end of the part A I make it as shown at H, Fig. 3, which resembles and in fact is the half of a journal box, as it performs one of the functions of a journal box or bearing in this device. Into this half journal box H is fastened the short cylinder part K, on one side of the periphery of which is attached the piece B, which is bolted to the shafts. Now the cylinder part K on the end of B has a hole through it in the line of its axis, through which a bolt E passes, as shown at E, E, Figs. 1 and 2. The clevis C is passed up by each end of the cylinder part K, as shown at Figs. 1 and 2, the ends of which clevis C have each a hole which comes in line with the hole through the axis of the cylinder part K through which a bolt E passes, and by means of the nut F the two parts C and K are permanently secured together and are not calculated to be taken apart. The lower side of the clevis C falling under the lower side of the half journal box H, it prevents the cylinder part K from being lifted out of the half journal box H. The jam nut and thumbscrew D by being screwed up prevents all possibility of getting loose, at the same time giving the shaft iron B the necessary freedom of motion, when it is desired to detach the shafts or pole as it may be. It is only necessary to lower the jam nut and thumb screw D and pull the lower part of the clevis C forward or toward the iron B and the shafts or pole of the vehicle becomes instantly detached.

Having thus fully described the principles of my invention and the manner of constructing and using the same, I wish it to be distinctly understood that I do not limit myself to the precise construction of shape, or of the metal used nor do I confine myself to any particular place or position for placing the arrangement on the axle. I am aware that there is a number of devices to prevent rattling, and also a number of arrangements for attaching and detaching shafts and poles instantly. I do not claim these ideas as new, but

What I do claim as my invention and desire to secure by Letters Patent is—

The combination of the clevis C and the thumb screw D with the shaft eye K and the half journal box H, (which is secured to the axle of the vehicle) the parts K and H being so constructed that when the clevis C which is secured to the shaft eye by the bolt and nut E, F, is in the position shown in Figs. 1 and 2 the parts K and H will be coupled together, but when the thumbscrew D is loosened and the bottom of the clevis C is pulled forward and upward toward B the parts K and H will be uncoupled.

In testimony whereof I, the said ANDREW J. RITTER, hereto subscribe my name in presence of the witnesses whose names are hereto subscribed on the 10th day of October A. D. 1859.

ANDREW J. RITTER.

Signed in our presence:
 JOSEPH NEFF,
 GILBERT C. RITTER.